United States Patent
Oldenhove

Patent Number: 6,132,638
Date of Patent: Oct. 17, 2000

[54] DUST CONTROL COMPOSITION

[75] Inventor: Louis Oldenhove, Heks, Belgium

[73] Assignee: Colgate-Palmolive Co., Piscataway, N.J.

[21] Appl. No.: 08/868,730

[22] Filed: Jun. 4, 1997

[51] Int. Cl.$^7$ .................................................. C09K 3/22
[52] U.S. Cl. ............................ 252/88.1; 44/602; 427/212
[58] Field of Search ........................... 252/88.1; 427/212; 44/602

[56] References Cited

U.S. PATENT DOCUMENTS

| | | | |
|---|---|---|---|
| 4,801,635 | 1/1989 | Zinkan et al. | 524/156 |
| 5,128,178 | 7/1992 | Roe | 44/602 |
| 5,271,859 | 12/1993 | Roe | 44/602 |
| 5,330,671 | 7/1994 | Pullen et al. | 252/88.1 |
| 5,785,979 | 7/1998 | Wells | 424/401 |

*Primary Examiner*—Gabrielle Brouillette
*Assistant Examiner*—Cephia D. Toomer
*Attorney, Agent, or Firm*—Richard E. Nanfeldt

[57] ABSTRACT

The present invention relates to a liquid dust control composition comprising an anionic surfactant, a dust control agent and water.

2 Claims, 4 Drawing Sheets

DUST CONTROL COMPOSITION

FIELD OF THE INVENTION

This present invention relates to a dust control composition which is applied to a surface thereby preventing the deposit of dust on the surface.

BACKGROUND OF THE INVENTION

A major problem is the prevention of the deposition of dust on substrates such as glass, wood or plastic. Dust particles from the air are constantly depositing on surfaces and are an ideal place for dust mites to reside in. The present invention relates to a liquid composition which can be coated onto a substrate thereby preventing the depositing of the dust on the substrate.

SUMMARY OF THE INVENTION

The present invention relates to a liquid dust control composition which is coated on a substrate in order to minimize the depositing of the dust on a substrate. The liquid dust control composition comprises at least one anionic surfactant, a dust control agent and water.

DETAILED DESCRIPTION OF THE INVENTION

Figure 1:
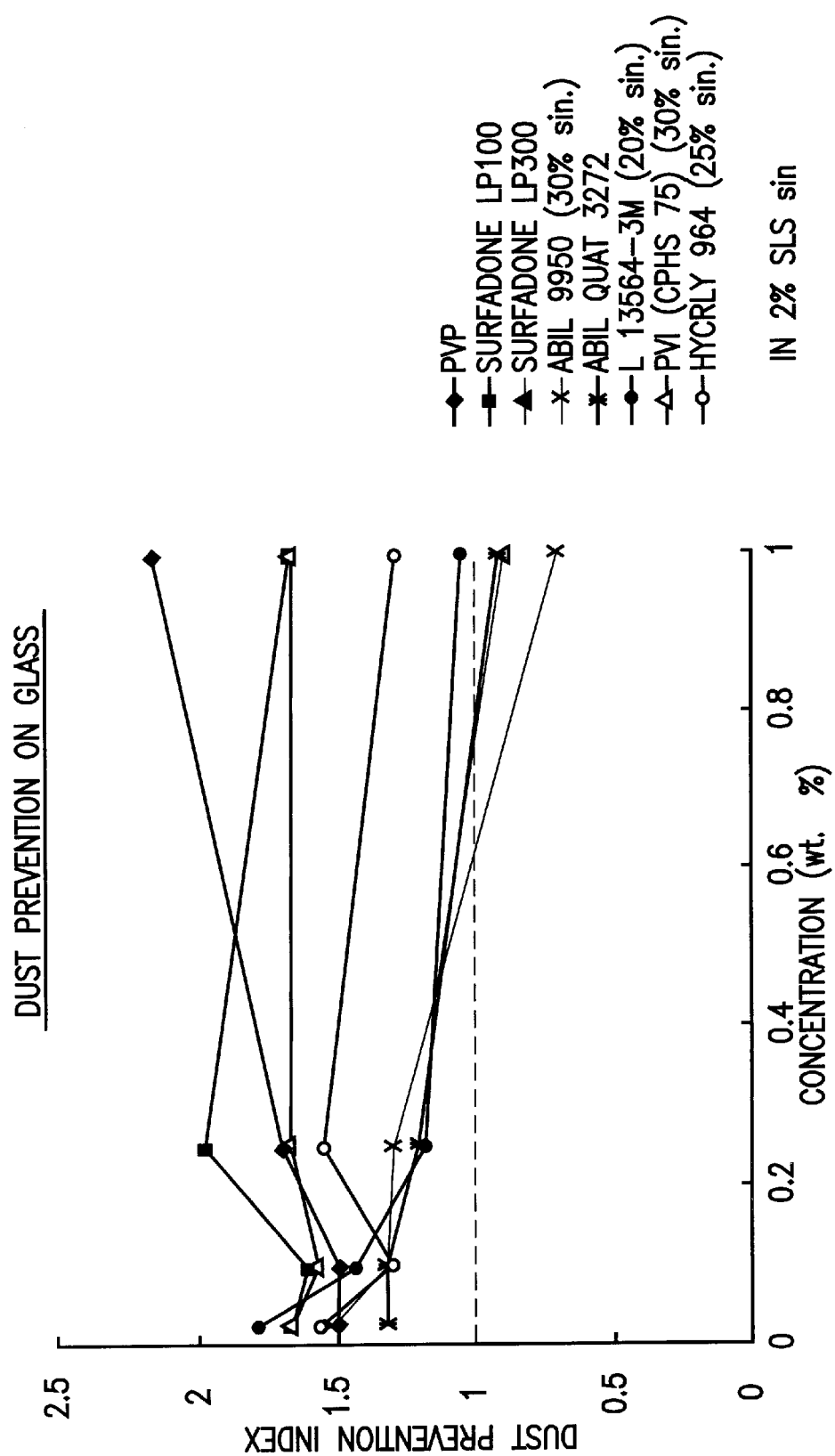
FIG. 1 illustrates a graph of a dust prevention index versus concentration of the dust control agents in a 2 wt. % solution of sodium lauryl sulfate in water for treatment on a glass surface.

The present invention relates to a liquid dust control composition comprising approximately by weight:
(a) 0.1% to 5.0%, more preferably 0.025% to 0.6% of at least one anionic surfactant;
(b) 0.025% to 1.0%, more preferably 0.5% to 4.0% of a dust control agent; and
(c) the balance being water.

Suitable water-soluble non-soap, anionic surfactants include those surface-active or detergent compounds which contain an organic hydrophobic group containing generally 8 to 26 carbon atoms and preferably 10 to 18 carbon atoms in their molecular structure and at least one water-solubilizing group selected from the group of sulfonate, sulfate and carboxylate so as to form a water-soluble detergent. Usually, the hydrophobic group will include or comprise a $C_8$–$C_{22}$ alkyl, or acyl group. Such surfactants are employed in the form of water-soluble salts and the salt-forming cation usually is selected from the group consisting of sodium, potassium, or magnesium, with the sodium and magnesium cations again being preferred.

Examples of suitable sulfonated anionic surfactants are the well known higher alkyl mononuclear aromatic sulfonates such as the higher alkyl benzene sulfonates containing from 10 to 16 carbon atoms in the higher alkyl group in a straight or branched chain, $C_8$–$C_{15}$ alkyl toluene sulfonates and $C_8$–$C_{15}$ alkyl phenol sulfonates.

A preferred sulfonate is linear alkyl benzene sulfonate having a high content of 3-(or higher) phenyl isomers and a correspondingly low content (well below 50%) of 2-(or lower) phenyl isomers, that is, wherein the benzene ring is preferably attached in large part at the 3 or higher (for example, 4, 5, 6 or 7) position of the alkyl group and the content of the isomers in which the benzene ring is attached in the 2 or 1 position is correspondingly low. Particularly preferred materials are set forth in U.S. Pat. No. 3,320,174.

Other suitable anionic surfactants are the olefin sulfonates, including long-chain alkene sulfonates, long-chain hydroxyalkane sulfonates or mixtures of alkene sulfonates and hydroxyalkane sulfonates. These olefin sulfonate detergents may be prepared in a known manner by the reaction of sulfur trioxide ($SO_3$) with long-chain olefins containing 8 to 25, preferably 12 to 21 carbon atoms and having the formula $RCH=CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. Preferred olefin sulfonates contain from 14 to 16 carbon atoms in the R alkyl group and are obtained by sulfonating an a-olefin.

Other examples of suitable anionic sulfonate surfactants are the paraffin sulfonates containing 10 to 20, preferably 13 to 17, carbon atoms. Primary paraffin sulfonates are made by reacting long-chain alpha olefins and bisulfites and paraffin sulfonates having the sulfonate group distributed along the paraffin chain are shown in U.S. Pat. Nos. 2,503,280; 2,507,088; 3,260,744; 3,372,188; and German Patent 735,096.

Examples of satisfactory anionic sulfate surfactants are the $C_8$–$C_{18}$ alkyl sulfate salts and the $C_8$–$C_{18}$ alkyl sulfate salts and the ethoxylated $C_8$–$C_{18}$ alkyl ether sulfate salts having the formula $R(OC_2H_4)_nOSO_3M$ wherein n is 1 to 12, preferably 1 to 5, and M is a metal cation selected from the group consisting of sodium, potassium, ammonium, magnesium and mono-, di- and triethanol ammonium ions. The alkyl sulfates may be obtained by sulfating the alcohols obtained by reducing glycerides of coconut oil or tallow or mixtures thereof and neutralizing the resultant product.

On the other hand, the ethoxylated alkyl ether sulfates are obtained by sulfating the condensation product of ethylene oxide with a $C_8$–$C_{18}$ alkanol and neutralizing the resultant product. The alkyl sulfates may be obtained by sulfating the alcohols obtained by reducing glycerides of coconut oil or tallow or mixtures thereof and neutralizing the resultant product. On the other hand, the ethoxylated alkyl ether sulfates are obtained by sulfating the condensation product of ethylene oxide with a $C_8$–$C_{18}$ alkanol and neutralizing the resultant product. The ethoxylated alkyl ether sulfates differ from one another in the number of moles of ethylene oxide reacted with one mole of alkanol. Preferred alkyl sulfates and preferred ethoxylated alkyl ether sulfates contain 10 to 16 carbon atoms in the alkyl group.

The ethoxylated $C_8$–$C_{12}$ alkylphenyl ether sulfates containing from 2 to 6 moles of ethylene oxide in the molecule also are suitable for use in the inventive compositions. These surfactants can be prepared by reacting an alkyl phenol with 2 to 6 moles of ethylene oxide and sulfating and neutralizing the resultant ethoxylated alkylphenol.

Other suitable anionic surfactants are the ethoxylated $C_9$–$C_{15}$ alkyl ether carboxylates having the structural formula $R(OC_2H_4)_nOX\ COOH$ wherein n is a number from 4 to 12, preferably 5 to 10 and X is selected from the group consisting of

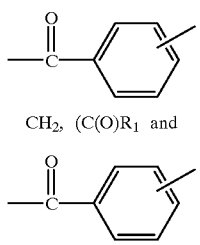

$CH_2$, $C(O)R_1$ and

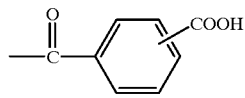

wherein $R_1$ is a $C_1$–$C_3$ alkylene group. Preferred compounds include $C_9$–$C_{15}$ alkyl ether polyethenoxy (7–9) C(O)$CH_2CH_2COOH$, $C_{13}$–$C_{15}$ alkyl ether polyethenoxy (7–9)

($CH_2CH_2O$) wherein is $R_f$ is F-($CF_2$—$CF_2$)$_y$, wherein y is 3 to 8, wherein x=1 to 50 (Zonyl FSN-Dupont), amphoteric $R_fCH_2CH(OCOCH_3)CH_2N^+(CH_3)_2CH_2CO_2^-$)Zonyl FSK-Dupont) wherein $R_f$ is F-($CF_2$—$CF_2$)$_y$, wherein y is 3 to 8, ($R_fCH_2CH_2O$)P(O)($ONH_4$)$_2$X plus nonfluorinated surfactant (Zonyl FSJ-Dupont), Hycryl 964 polyacrylate polymer containing Ubatol U-3910, Zonyl FSP which is ($R_fCH_2CH_2O$)P(O)($ONH_4$)$_2$, wherein $R_f$ is F-($CF_2$—$CF_2$)$_y$, wherein y-3 to 8 and Avitex E is a choline compound.

The following examples illustrate the liquid dust control compositions of the described invention. Unless otherwise specified, all percentages are by weight. The exemplified compositions are illustrative only and do not limit the scope of the invention.

EXAMPLE 1

The following compositions were made by simple mixing at 25° C.:

|  | A | B | C | D | E | F | G | H | I |
|---|---|---|---|---|---|---|---|---|---|
| Sodium lauryl sulfate | 2% | 2% | 2% | 2% | 2% | 2% | 2% | 2% | 2% |
| Polyvinyl pyrrolidone | 0.25–1% | | | | | | | | |
| Surfadone LP100 | | 0.25–1% | | | | | | | |
| Surfadone LP300 | | | 0.25–1% | | | | | | |
| Abil 9950 (30%) | | | | 0.008–0.30% | | | | | |
| Abil Quat 3272 | | | | | | 0.25–1% | | | |
| Water soluble polymer containing perfluroalkyl units | | | | | | | 0.006–.20% | | |
| Polyvinyl pyrrolidone polyvinyl imidazole (30%) | | | | | | | | 0.008–0.3% | |
| Hycryl 964 (25%) | | | | | | | | | 0.007–0.25% |
| Water | Bal. | Bal. | Bal. | Bal. | Bal. | Bal. | Bal. | Bal. | Bal. | and $C_{10}$–$C_{12}$ alkyl ether polyethenoxy (5–7) CH2COOH. These compounds may be prepared by considering ethylene oxide with appropriate alkanol and reacting this reaction product with chloracetic acid to make the ether carboxylic acids as shown in U.S. Pat. No. 3,741,911 or with succinic anhydride or phthalic anhydride. Obviously, these anionic surfactants will be present either in acid form or salt form depending upon the pH of the final composition, with salt forming cation being the same as for the other anionic surfactants.

Of the foregoing non-soap anionic surfactants used in forming the instant compositions the preferred anionic surfactant is a sodium $C_8$–$C_{18}$ linear alkyl benzene sulfonate.

The dust control agent is selected from the group consisting of polyvinyl pyrrolidone having a molecular weight of about 10,000 to 1,000,000, $C_8$–$C_{12}$ alkyl 2-pyrrolidone such as N-octyl-2-pyrrolidone (Surfadone LP100)/$C_8$–$C_{12}$ N-dodecyl-2-pyrrolidone (Surfadone LP300), polysiloxane polyorgano betaine copolymer (Abil 9950), a diquaternary polydimethyl siloxane (Abil Quat 3272), (a water soluble polymer to which is anchored perfluoralkyl units) L13564 by 3M, a copolymer of polyvinyl pyrrolidone/polyvinyl-imidazole copolymer (CPHS75-BASF Corp.), a polyvinyl pyrrolidone/polyacrylate copolymer (Gaftex 1033), an alkoxy silane-quaternary compound (DC5700-Dow Corning), cyclotetra dimethyl siloxane (DC344-Dow Corning), cyclopenta dimethyl siloxane (DC345-Dow Corning), diethyl cyclohexyl amine salt of lauryl sulfate (Duponol G-Dupont), anionic $R_fCH_2CH_2SO_3X$, wherein X=H or NH4 (Zonyl TBS-Dupont), nonionic $R_fCH_2CH_2O$ Formulas A to H were tested as dust control compositions on glass and the results are depicted in FIG. 1. The glass was first cleaned with a detergent, then rinsed with water, then cleaned with ethanol and dried with a paper towel. Half of the piece of glass was treated with solutions A–H. The glass was allowed to dry and subsequently dust was sifted through a screen onto the glass half of which had been treated. An image acquisition of the glass was done on a dark screen wherein the treated portion of the glass appears darker than the untreated portion of the glass. A measurement of the dust prevention index (I) was made wherein $$I = \frac{G_L \text{ reference (untreated glass)}}{G_L \text{ treated glass}}$$

wherein $G_L$ is the average grey level from the image acquisition. FIG. 1 illustrates a graph of the dust prevention index versus concentration (wt. %) of the dust control agent in the composition. For a composition not containing any dust control agent the dust prevention index is 1.0.

EXAMPLE 2

Figure 2:
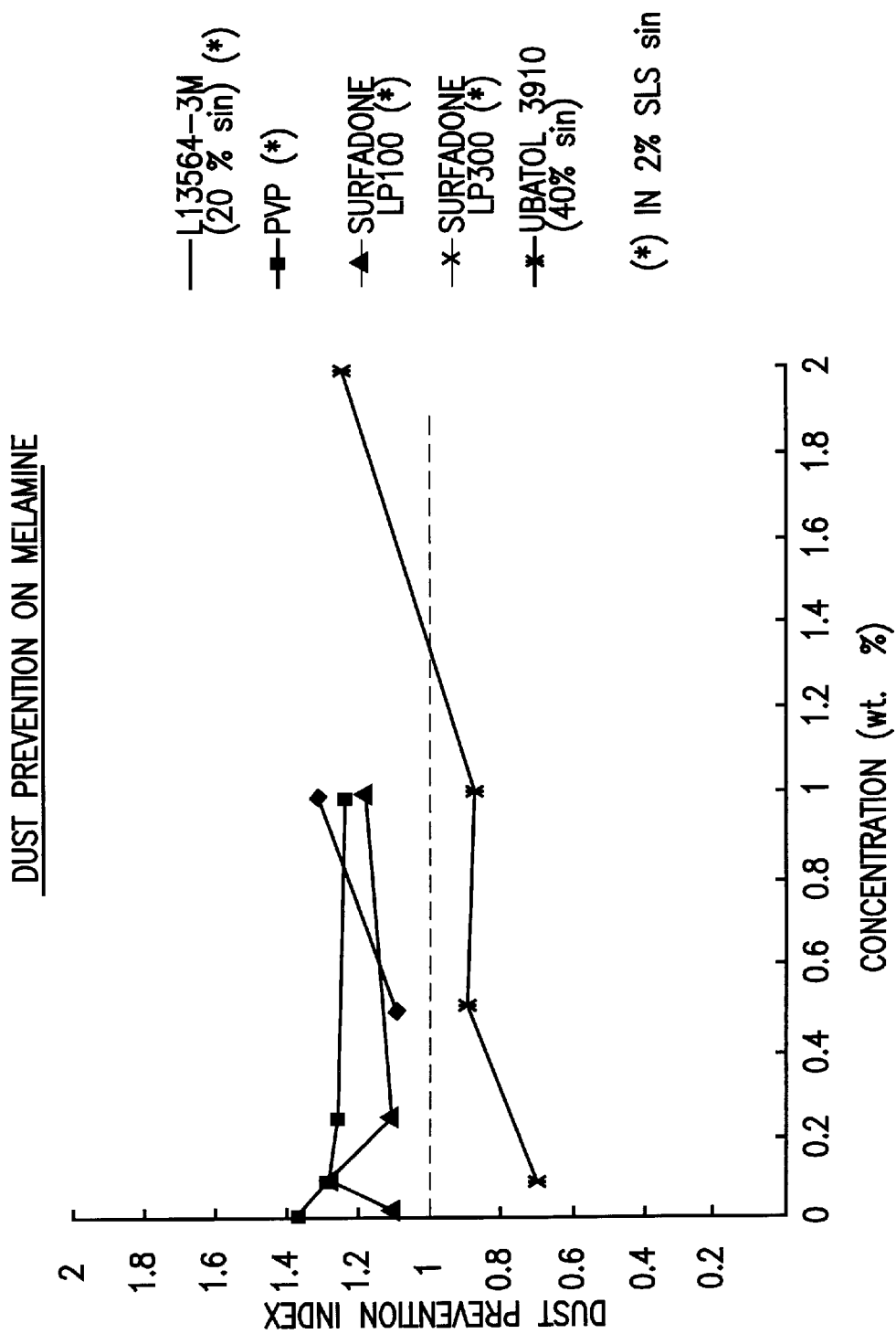
FIG. 2 illustrates a graph of a dust prevention index versus concentration of the dust control agents in a 2 wt. % solution of sodium lauryl sulfate in water for treatment on a melamine surface.

The following compositions were made by simple mixing at 25° C. and tested on a melamine surface by the same test procedure as used in Example I. The results are depicted in FIG. 2.

|  | A | B | C | D | E |
|---|---|---|---|---|---|
| Sodium lauryl sulfate | 2% | 2% | 2% | 2% | 2% |
| L13564-3M (20%) | 0.02–0.2% | | | | |
| Polyvinyl pyrrolidone | | 0.02–2% | | | |
| Surfadone LP100 | | | 0.02–2% | | |
| Surfadone LP300 | | | | 0.02–2% | |
| Ubatol 3910 (40%) | | | | | 0.02–0.4% |
| Water | Bal. | Bal. | Bal. | Bal. | Bal. |

EXAMPLE 3

Figure 3:
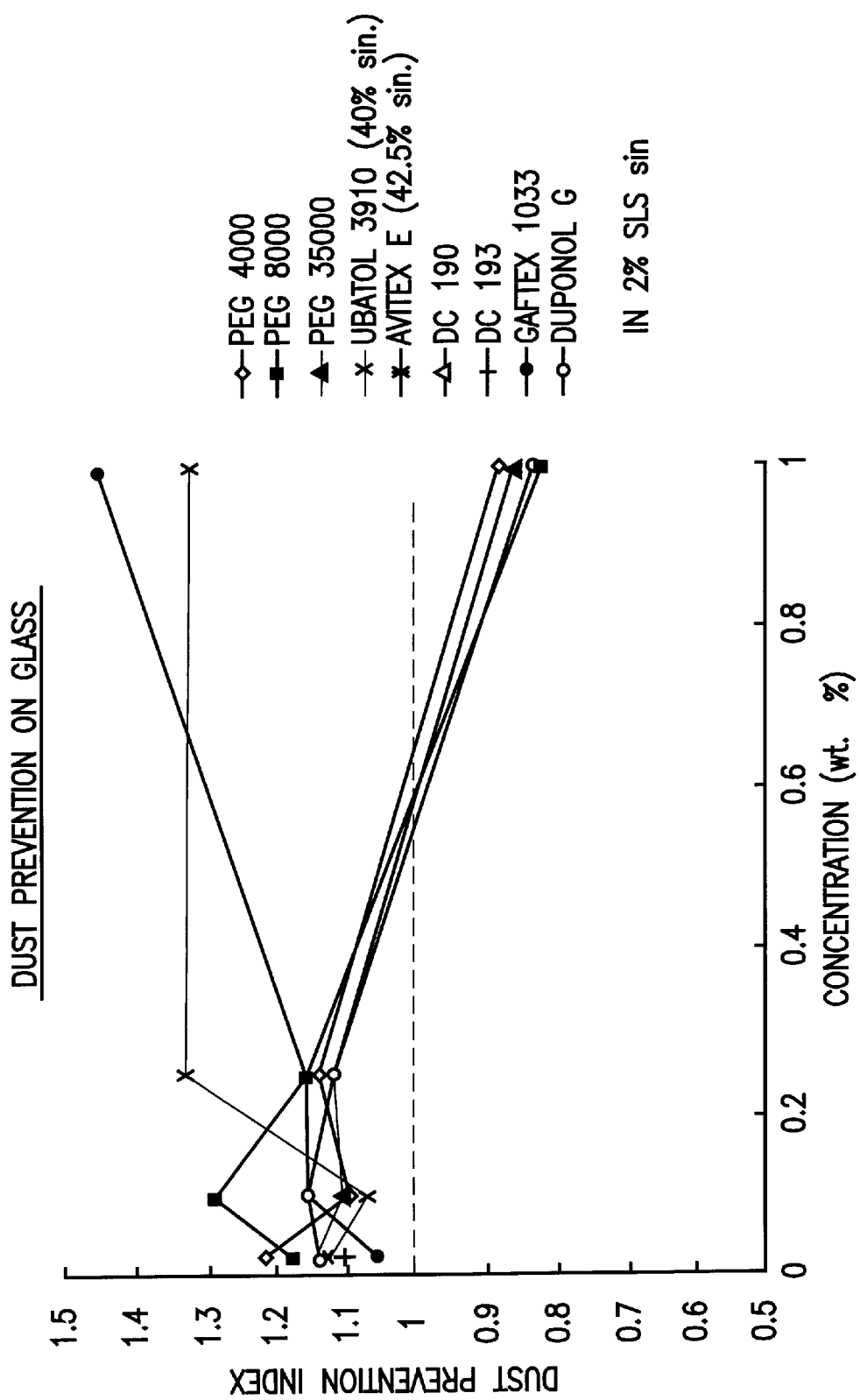
FIG. 3 illustrates a graph of a dust prevention index versus concentration of the dust control agents in a 2 wt. % solution of sodium sodium lauryl sulfate in water for treatment on a glass surface.

The following compositions were made by simple mixing at 25° C. and tested on a glass surface by the same test procedure as used in Example I. The results are depicted in FIG. 3.

|  | A | B | C | D | E |
|---|---|---|---|---|---|
| Sodium lauryl sulfate | 2% | 2% | 2% | 2% | 2% |
| Avitex E (42.5% sol) | 0.025–1% | | | | |
| DC190 | | 0.025–1% | | | |
| DC193 | | | 0.025–1% | | |
| Gaftex 1033 | | | | 0.025–1% | |
| Water | Bal. | Bal. | Bal. | Bal. | Bal. |

EXAMPLE 4

Figure 4:
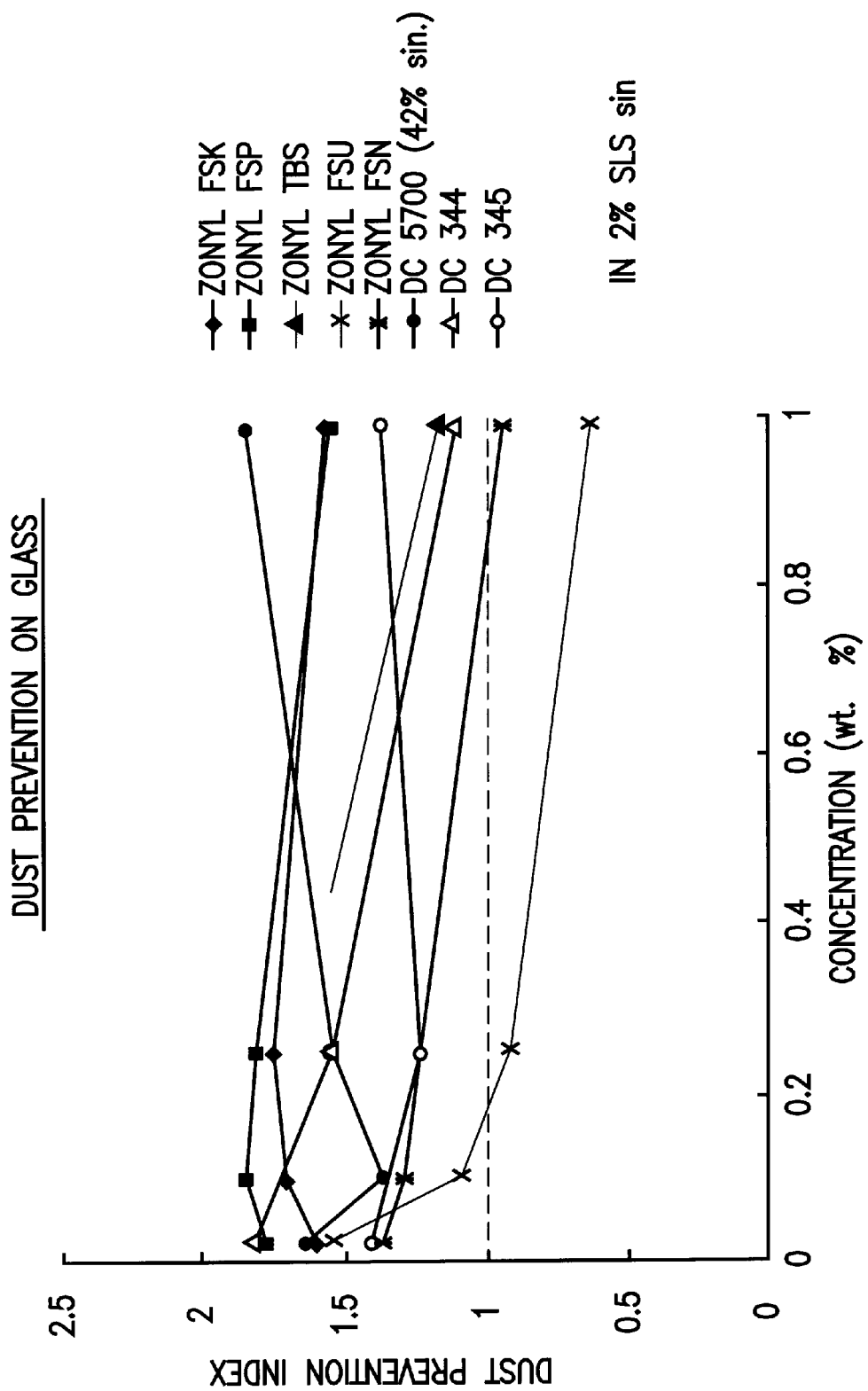
FIG. 4 illustrates a graph of a dust prevention index versus concentration of the dust control agents in a 2 wt. % solution of sodium $C_8$–$C_{15}$ linear alkyl benzene sulfonate in water for treatment on a glass surface.

The following compositions were made by simple mixing at 25° C. and tested on a glass surface by the same test procedure as used in Example I. The results are depicted in FIG. 4.

|  | A | B | C | D | E | F | G | H |
|---|---|---|---|---|---|---|---|---|
| Sodium lauryl sulfate | 2% | 2% | 2% | 2% | 2% | 2% | 2% | 2% |
| Zonyl FSK | | 0.025–1% | | | | | | |
| Zonyl FSP | | | 0.025–1% | | | | | |
| Zonyl TBS | | | | 0.025–1% | | | | |
| Zonyl FSN | | | | | 0.025–1% | | | |
| DC344 | | | | | | 0.025–1% | | |
| DC345 | | | | | | | 0.025–1% | |
| DC5700 | | | | | | | | 0.025–1% |
| Water | Bal. | Bal. | Bal. | Bal. | Bal. | Bal. | Bal. | Bal. |

What is claimed is:

1. A liquid dust control composition comprising approximately by weight:
    (a) 0.1% to 5.0% of at least one anionic surfactant;
    (b) 0.025% to 1.0% of a dust control agent, wherein said dust control agent is selected from the group consisting of polyvinyl pyrrolidone, a water soluble polymer containing perfluoroalkyl units, a polysiloxane polyorganobetaine copolymer, a diquaternary polydimethyl siloxane, a $C_8$–C12 alkyl 2-pyrrolidone, a polyvinyl pyrrolidone/polyvinyl-imidazole copolymer and a polyvinyl pyrrolidone/polyacrylate copolymer; and
    (c) the balance being water.

2. The composition according to claim 1 wherein said anionic surfactant is a sulfate surfactant.

* * * * *